United States Patent
Sato

(10) Patent No.: US 10,165,145 B2
(45) Date of Patent: Dec. 25, 2018

(54) IMAGE PROCESSING APPARATUS, METHOD FOR CONTROLLING IMAGE PROCESSING APPARATUS, AND STORAGE MEDIUM

(71) Applicant: CANON KABUSHIKI KAISHA, Tokyo (JP)

(72) Inventor: Tomoya Sato, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/457,677

(22) Filed: Mar. 13, 2017

(65) Prior Publication Data
US 2017/0187904 A1    Jun. 29, 2017

Related U.S. Application Data

(63) Continuation of application No. 14/961,631, filed on Dec. 7, 2015, now Pat. No. 9,639,242.

(30) Foreign Application Priority Data

Dec. 9, 2014 (JP) .................................. 2014-249413

(51) Int. Cl.
*H04N 1/00* (2006.01)
*G06T 13/80* (2011.01)
(Continued)

(52) U.S. Cl.
CPC ....... *H04N 1/00931* (2013.01); *G06F 3/0482* (2013.01); *G06F 3/04817* (2013.01); *G06F 3/04886* (2013.01); *G06T 13/80* (2013.01); *H04N 1/00411* (2013.01); *H04N 1/00424* (2013.01); *H04N 1/00464* (2013.01); *H04N 1/00469* (2013.01); *H04N 1/00474* (2013.01); *H04N 1/00501* (2013.01); *H04N 1/00506* (2013.01); *G06T 2200/24* (2013.01);
(Continued)

(58) Field of Classification Search
CPC .......... H04N 1/00931; H04N 1/00474; H04N 1/00506; H04N 1/00469; H04N 1/00464; H04N 1/00424; H04N 1/00411; H04N 1/00501; H04N 2201/0089; H04N 2201/0094; G06T 13/80; G06T 2200/24
USPC ....................................................... 358/1.15
See application file for complete search history.

(56) References Cited

U.S. PATENT DOCUMENTS 6,664,965 B1 * 12/2003 Yamamoto ............. A63F 13/08
345/473
2012/0162251 A1 * 6/2012 Minamino ............. G11B 27/34
345/629
(Continued)

FOREIGN PATENT DOCUMENTS

JP       2012114703 A     6/2012
JP       2013122621 A     6/2013
(Continued)

*Primary Examiner* — Allen H Nguyen
(74) *Attorney, Agent, or Firm* — Canon U.S.A., Inc. IP Division

(57) ABSTRACT

When a registration request of an application button is received, an information processing apparatus generates an image for transition if an activation-completed notification is received. If the activation-completed notification is not received, the information processing apparatus generates the image for transition after the activation-completed notification is received.

11 Claims, 10 Drawing Sheets

(51) Int. Cl.
*G06F 3/0482* (2013.01)
*G06F 3/0488* (2013.01)
*G06F 3/0481* (2013.01)

(52) U.S. Cl.
CPC ............... *H04N 2201/0089* (2013.01); *H04N 2201/0094* (2013.01)

(56) References Cited

U.S. PATENT DOCUMENTS

| | | | | |
|---|---|---|---|---|
| 2012/0287466 | A1* | 11/2012 | Itoh | H04N 1/00411 358/1.15 |
| 2014/0118781 | A1* | 5/2014 | Kobayashi | G06F 3/048 358/1.15 |
| 2014/0362399 | A1* | 12/2014 | Sugimoto | H04N 1/00381 358/1.15 |
| 2015/0092235 | A1* | 4/2015 | Ishii | H04N 1/0097 358/1.16 |
| 2015/0172481 | A1* | 6/2015 | Komaba | H04N 1/00411 358/1.13 |
| 2015/0189163 | A1* | 7/2015 | Ozaki | H04N 5/23216 348/333.01 |

FOREIGN PATENT DOCUMENTS

| | | | |
|---|---|---|---|
| JP | 2013257603 A | * | 12/2013 |
| JP | 2014157532 A | | 8/2014 |

* cited by examiner

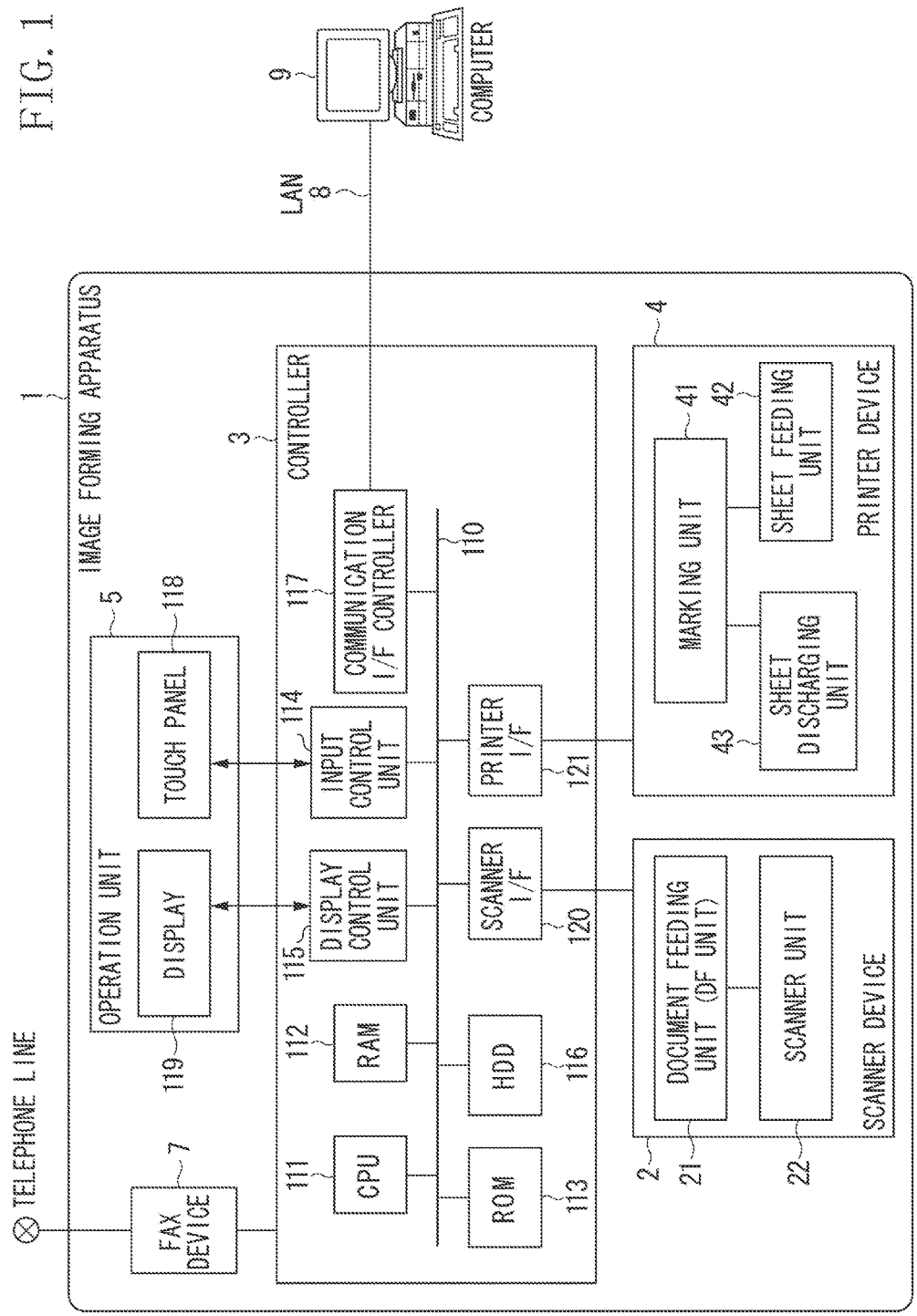

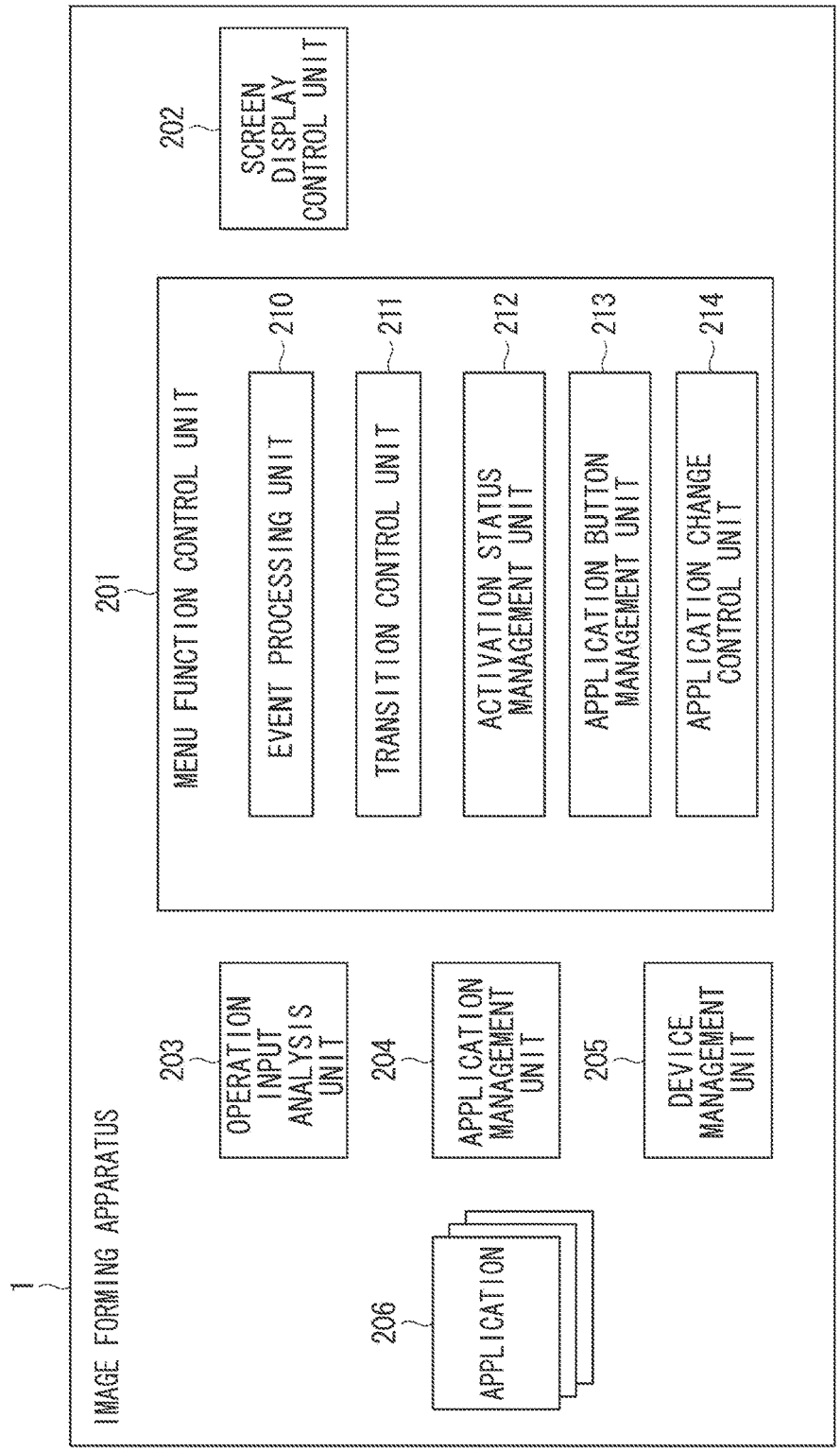

FIG. 3

| BUTTON NAME | ICON (S) | ICON (M) | ICON (L) | APPLICATION ID |
|---|---|---|---|---|
| COPY | copy_s.png | copy_m.png | copy_l.png | 1234abcd-d84a-4cdd-a1f7-8d5e3aeacd3c |
| SCAN AND SAVE | box_scan_s.png | box_scan_m.png | box_scan_l.png | 1234abcd-29c2-46c5-a07a-a6c4177a61e3 |
| SCAN AND SEND | send_scan_s.png | send_scan_m.png | send_scan_l.png | 1234abcd-116a-46fc-aa83-ef3f97282606 |
| FUNCTION A | func_a_s.png | func_a_m.png | func_a_l.png | 1234abcd-1e78-415e-82a2-3b802bca10b2 |
| FUNCTION B | func_b_s.png | func_b_m.png | func_b_l.png | 1234abcd-35bc-4195-b8d6-7cec8f0a2e05 |
| ... | ... | ... | ... | ... |
| FUNCTION C | func_c_s.png | func_c_m.png | func_c_l.png | 1234abcd-0119-1000-975b-00e000c4ae6f |
| FUNCTION D | func_d_s.png | func_d_m.png | func_d_l.png | 1234abcd-aa81-4aae-95c7-d746db532c88 |

301 302 303 304 305

IMAGE PROCESSING APPARATUS, METHOD FOR CONTROLLING IMAGE PROCESSING APPARATUS, AND STORAGE MEDIUM

CROSS REFERENCE TO RELATED APPLICATIONS

The present application is a continuation of U.S. patent application Ser. No. 14/961,631, filed Dec. 7, 2015, entitled "IMAGE PROCESSING APPARATUS, METHOD FOR CONTROLLING IMAGE PROCESSING APPARATUS, AND STORAGE MEDIUM", which claims priority from Japanese Patent Application No. 2014-249413, filed Dec. 9, 2014, the contents of which are hereby incorporated by reference herein in their entireties.

BACKGROUND

Field

Aspects of the present invention generally relate to animation display by an image processing apparatus.

Description of the Related Art

Some recent multifunctional image forming apparatuses display a list of, for example, button icons representing functions provided by the multifunctional image forming apparatus, and enable a user to select a desired function from among such button icons. A screen displaying the functions to the user and enabling the user to select a function is referred to as a menu screen. The menu screen is displayed when the button dedicated to calling the menu screen is pressed or when the image forming apparatus is activated.

When the button on the menu screen is pressed, the image forming apparatus performs a process for changing the display to a functional screen corresponding to the pressed button while animating the displayed menu screen. The animation displayed when the screen is changed is referred to as transition animation.

Japanese Patent Application Laid-Open No. 2007-52403 discusses a display device that, when screens are changed, changes the display content while adding various effects according to a change instruction. According to Japanese Patent Application Laid-Open No. 2007-52403, a user can easily recognize changing of the screens because the change in display content is accompanied by the effects. By displaying the transition animation when the screens are changed, a more sophisticated user interface is provided to the user. Even if it takes time to display the screen of the selected function, the user can feel as if the waiting time is short because the transition animation is displayed as soon as the button on the menu screen is pressed.

In an image forming apparatus such as an MFP, the time after the power is turned on and before any of image forming functions (such as a copying function) is enabled is referred to as a warm-up time. Some image forming apparatuses such as the MFP require a warm-up time of approximately 30 seconds after the power is turned on, for energization, initialization, and activation of each functional part. The warm-up time is strongly required to be shorter.

Since the aforementioned image forming apparatuses perform the process for displaying the transition animation, however, the warm-up time may become longer.

SUMMARY

Aspects of the present invention are generally directed to an image processing apparatus, a method for controlling an image processing apparatus, and a storage medium, which are capable of providing a sophisticated user interface by displaying animation in changing screens while suppressing an influence on a warm-up time.

According to an aspect of the present invention, an information processing apparatus that executes a plurality of applications includes a reception unit configured to receive a registration request of an application button from each of the plurality of applications, a first display control unit configured to display the application button according to the registration request on a menu screen for selecting one application from the plurality of applications according to the reception of the registration request of the application button by the reception unit, and a second display control unit configured to perform control such that, according to selection of one application button on the menu screen, if an image for transition has been generated, screen transition to a screen of an application corresponding to the selected application button is performed after displaying an animation using the image, and if the image for transition has not been generated, the screen transition to the screen of the application corresponding to the selected application button is performed without displaying the animation.

Further features of the present disclosure will become apparent from the following description of exemplary embodiments with reference to the attached drawings.

BRIEF DESCRIPTION OF THE DRAWINGS

FIG. 1 is a diagram illustrating a hardware configuration of an image forming apparatus according to an exemplary embodiment.

FIG. 2 is a diagram illustrating a software configuration of an image forming apparatus according to an exemplary embodiment.

FIG. 3 is a diagram schematically illustrating application button information held by an application button management unit according to an exemplary embodiment.

DESCRIPTION OF THE EMBODIMENTS

Figure 4A:
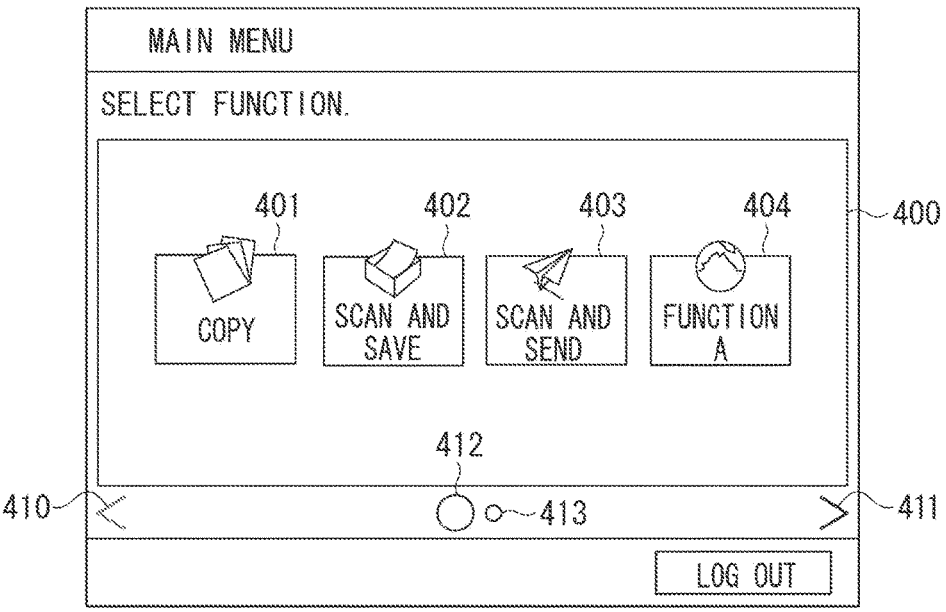
FIGS. 4A and 4B illustrate examples of a menu screen displayed on a display of an image forming apparatus according to an exemplary embodiment.

Exemplary embodiments are hereinafter described with reference to the drawings.

FIG. 1 is a block diagram illustrating a system configuration according to a first exemplary embodiment.

An image forming apparatus 1 is a multifunction peripheral that can execute various jobs including copying and printing. The image forming apparatus 1 includes a scanner device 2, a printer device 4, a controller 3, an operation unit 5, and a facsimile (FAX) device 7.

The scanner device 2 includes a document feeding unit 21 that can automatically and sequentially exchange document bundles, and a scanner unit 22 that can optically scan a document and convert the scanned document into a digital image. The scanner device 2 transmits the converted image data to the controller 3.

The printer device 4 is a device for printing the digital image. The printer device 4 includes a sheet feeding unit 42 that can sequentially feed sheets one by one out of a sheet bundle, a marking unit 41 used for printing the image data on the fed sheet, and a sheet discharging unit 43 used for discharging the printed sheet.

The operation unit 5 includes a touch panel 118, a display 119, and the like, and is used to display a screen for setting various functions of the apparatus and to operate the apparatus or indicate operations.

The FAX device 7 sends the digital image to a telephone line or the like.

The controller 3 includes a central processing unit (CPU) 111, a random access memory (RAM) 112, a read-only memory (ROM) 113, an input control unit 114, a display control unit 115, a hard disc drive (HDD) 116, a communication interface (I/F) controller 117, a scanner I/F 120, and a printer I/F 121, which are connected to a system bus 110. Each of the units connected to the system bus 110 can mutually exchange data via the system bus 110.

The ROM 113 is a nonvolatile memory, and stores pieces of data including the image data and various programs for operating the CPU 111 in respective predetermined areas. The RAM 112 is a volatile memory and is used as a main memory of the CPU 111 or a temporary storage region for a work area, for example. The CPU 111 uses the RAM 112 as a work memory to control each unit of the image forming apparatus 1 according to the programs stored in the ROM 113, for example. The programs for operating the CPU 111 are not necessarily stored in the ROM 113 and may be stored in advance in the HDD 116 or an external memory.

The input control unit 114 accepts a user operation, generates a control signal according to the operation, and supplies the signal to the CPU 111. For example, the touch panel 118 is connected to the input control unit 114 and the touch panel 118 is used as an input device to accept the user operation. The touch panel 118 is an input device with a planar input unit, for example. The touch panel 118 outputs coordinate information according to a contact position on the input unit. The CPU 111 controls each unit of the image forming apparatus 1 according to the programs based on the control signals generated by the input control unit 114 in response to the user operation on the input device. This can cause the image forming apparatus 1 to operate according to the user operation.

The display control unit 115 outputs a display signal for displaying an image on the display 119. For example, a display control signal generated based on a program by the CPU 111 is supplied to the display control unit 115. The display control unit 115 generates a display signal according to the display control signal and outputs the display signal to the display 119. For example, the display control unit 115 causes the display 119 to display a graphical user interface (GUI) screen constituting a GUI based on the display control signal generated by the CPU 111. The display control unit 115 includes a graphics processing unit (GPU) which is a calculating unit dedicated to image processing. The display control unit 115 can supply the display control signal to the display 119 without burdening the CPU 111 in regard to a transition display described below.

The touch panel 118 is integrated with the display 119. For example, the touch panel 118 is configured to have a transmissivity that does not interrupt producing the display by the display 119, and is attached above the display surface of the display 119. An input coordinate on the touch panel 118 is associated with a display coordinate on the display 119. This can constitute a GUI that enables the user to feel as if the user could directly operate the screen displayed on the display 119.

The communication I/F controller 117 performs communication via a local area network (LAN) 8, the Internet, or other various wired or wireless networks under control of the CPU 111. Via the scanner I/F 120, the image data is input from the scanner device 2 and scanner control data is input/output. Via the printer I/F 121, the image data is output to the printer device 4 and printer control data is input/output.

The CPU 111 of the controller 3 executes various control programs to instruct each connected module, thereby executing a scanning job and a printing job in the image forming apparatus 1. The image forming apparatus 1 can, for example, input/output the digital image to/from the computer 9 via the LAN 8 and issue a job. The computer 9 can be connected to the image forming apparatus 1 via a web browser to install an application in the image forming apparatus 1, so that an additional function can be obtained.

FIG. 2 is a diagram illustrating a software configuration in regard to the control of a menu screen of the image forming apparatus 1 according to the present exemplary embodiment. Each software module in the image forming apparatus 1 illustrated in FIG. 2 is realized by the CPU 111 reading out and executing the control programs stored in the ROM 113 or the HDD 116.

The image forming apparatus 1 includes software modules of a menu function control unit 201, a screen display control unit 202, an operation input analysis unit 203, an application management unit 204, a device management unit 205, and applications 206.

The operation input analysis unit 203 analyzes the control signal supplied from the input control unit 114 and notifies an event according to the user operation to the menu function control unit 201.

The device management unit 205 manages and controls the devices including the scanner device 2, the printer device 4, and the FAX device 7. When the image forming apparatus 1 is activated, the device management unit 205 performs control to activate the scanner device 2, the printer device 4, and the FAX device 7. After the activation of each device is completed, the device management unit 205 notifies the completion of the activation as an event to the menu function control unit 201.

The screen display control unit 202 supplies the display control signal to the display control unit 115, and displays the data generated by the menu function control unit 201 or the applications 206 on the display 119.

The applications 206 are modules that provide the functions of the image forming apparatus 1 to the user using the function of, for example, the scanner device 2, the printer device 4, or the FAX device 7. The image forming apparatus 1 can have a plurality of applications such as "copy", "scan", "fax", and "web browser". An administrator who manages the image forming apparatus 1 can make a connection to the image forming apparatus 1 from the computer 9 via a web browser to install an application in the image forming apparatus 1, so that an additional function is obtained.

The application management unit 204 is a module that manages the applications 206. When the image forming apparatus 1 is activated, the plurality of applications 206 is activated by an instruction from the application management unit 204 and the applications 206 request the application management unit 204 to register buttons. The application management unit 204 accepts the button registration requests from the applications 206, and notifies an application button registration event to the menu function control unit 201. In other words, when the image forming apparatus 1 is activated, the plurality of applications 206 is activated and application button registration processes are sequentially performed. The application management unit 204 changes screens in response to a request from an application change control unit 214.

The menu function control unit 201 is a module that controls the entire functions of the menu. The menu function control unit 201 includes an event processing unit 210, a transition control unit 211, an activation status management unit 212, an application button management unit 213, and the application change control unit 214.

The event processing unit 210 receives an event notified by the operation input analysis unit 203, the application management unit 204, or the device management unit 205, and calls a process according to the received event.

The transition control unit 211 performs a process for generating/holding the image for transition (screen change). When the application button on the menu is pressed to change the applications, the transition control unit 211 performs a process for displaying transition animation. The activation status management unit 212 receives the activation-completed event from the device management unit 205, and holds the activation-completed state. Upon the notification of the application button registration event from the application management unit 204, the application button management unit 213 holds the notified information and performs a process for displaying the information as a button on the menu screen.

The application change control unit 214 requests the application management unit 204 to change the screens to the applications 206 corresponding to the application button that has been pressed by the user on the menu screen. Then, the transition control unit 211 executes the transition. The details of the process of the menu function control unit 201 are described below.

FIG. 3 is a schematic view illustrating the application button information held by the application button management unit 213. The application button information includes information about a button name 301, icons (302, 303, and 304), and an application identification data (ID) 305 for each of the buttons disposed on the menu screen. The button name 301 is a character string displayed on the application button, and the icons (302, 303, and 304) are icons displayed on the application button. The size of the icon includes small (S), medium (M), and large (L), which is selected according to the layout of the menu. The application ID 305 is an ID for uniquely identifying the application. These pieces of information are notified when the applications 206 perform the application button registration process at the time of the activation of the applications 206, and are held by the application button management unit 213.

Figure 4B:
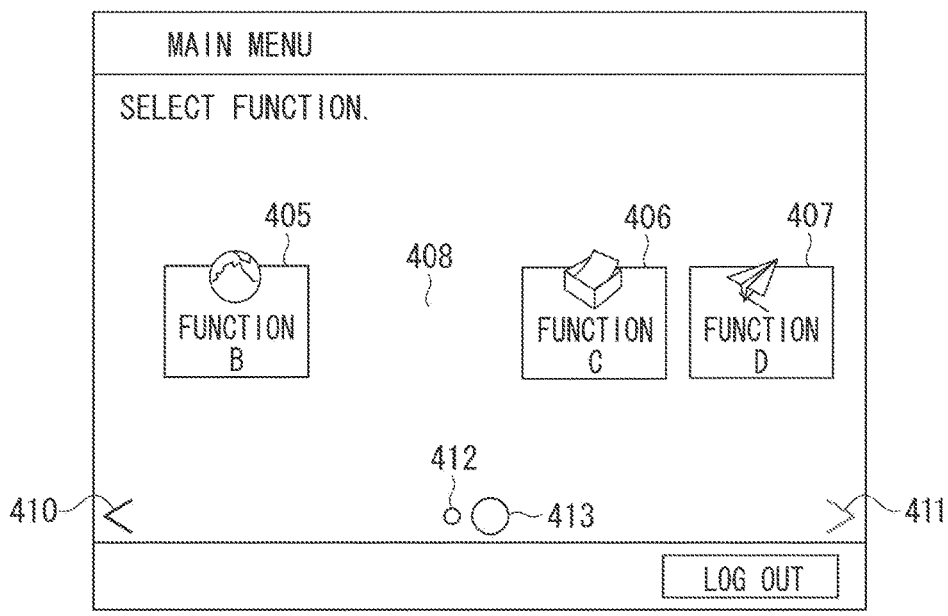

FIGS. 4A and 4B are diagrams each illustrating an example of the menu screen generated by the menu function control unit 201 and displayed on the display 119 via the screen display control unit 202. When the menu screen is called, the screen of FIG. 4A is displayed. An application button display region 400 includes a plurality of application buttons. Application buttons 401 to 404 are additionally displayed on the menu screen when the applications 206 have requested the button registration. On each button, the button name and the icon registered from the applications 206 and held by the application button management unit 213 are displayed. If the CPU 111 determines that any of these buttons is pressed from the event notified from the operation input analysis unit 203, the screens are changed to display the application screen which provides the function. Page indicators 412 and 413 are illustrated schematically with a circular mark, and a plurality of pages are present side by side virtually in a horizontal direction. In FIG. 4A, the page indicator 412 indicates the currently displayed page with a larger circular mark than the indicators of other pages (413 in FIG. 4A). This screen contains two page indicators (412 and 413), which indicate that the menu contains two pages in total. The currently displayed page corresponds to the first page of the menu that is virtually disposed on the leftmost side. In this example, the currently displayed page is expressed by the page indicator with a larger size but may be expressed by any other way. For example, the currently displayed page may be expressed by an indicator with a different color or shape.

Of page transition buttons 410 and 411, the button 410 is a button for causing the currently displayed page to transition to the page on the virtually left side of the currently displayed page, and the button 411 is a button for causing the currently displayed page to transition to the page on the virtually right side of the currently displayed page. The page transition buttons 410 and 411 are displayed in gray and disabled if the page does not exist on the left side or the right side of the currently displayed page. For example, in FIG. 4A, the page does not exist on the left side of the currently displayed page, so that the button 410 is displayed in gray.

The screen of FIG. 4A transitions to the screen of FIG. 4B when the button 411 on the screen of FIG. 4A is pressed or when a flick from the right to the left on the screen of FIG. 4A is detected. In FIG. 4B, application buttons 405 to 407 are displayed in the application button display region. In FIG. 4B, the page indicator 412 has the normal size and the indicator 413 has a large circular mark. This indicates that the right page (second page) is currently shown. The button 411 is now displayed in gray and disabled, while the button 410 becomes effective. The screen of FIG. 4B returns to the screen of FIG. 4A if the button 410 is pressed or the flick from the left to the right is detected on the screen of FIG. 4B.

FIGS. 4A and 4B illustrate the example of the menu containing two screens (two pages). More screens (pages) may be displayed depending on the total number of application buttons. The user can change the layout of the application buttons and the screen (page) included in the menu may change according to the layout.

Figure 5A:
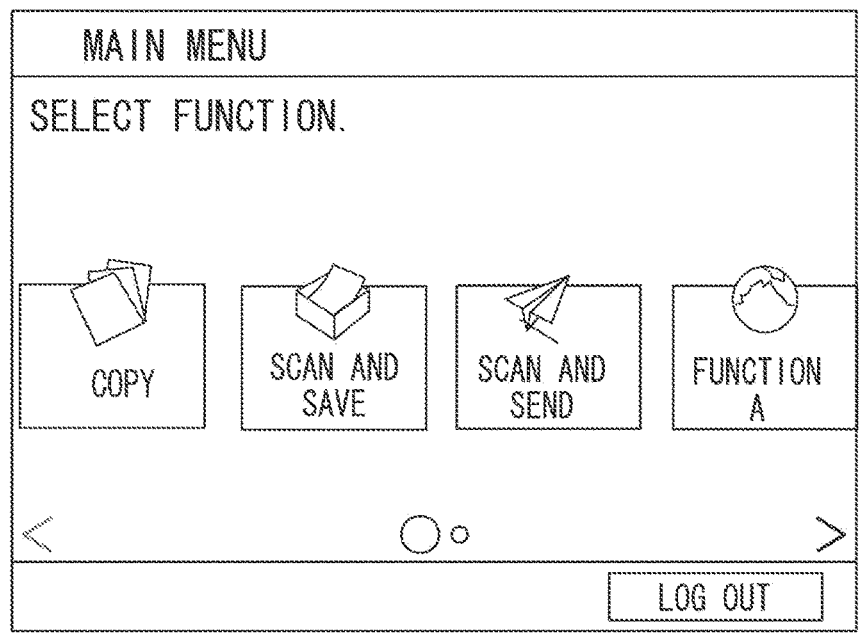
FIGS. 5A, 5B, 5C and 5D illustrate an example of a screen transition involving a transition animation displayed on a display of an image forming apparatus according to an exemplary embodiment.
Figure 5B:
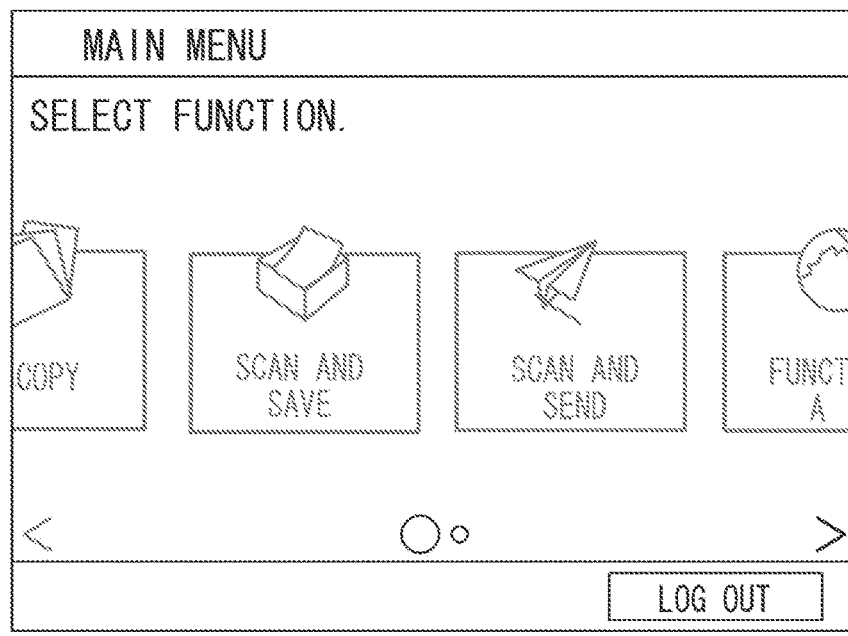
Figure 5C:
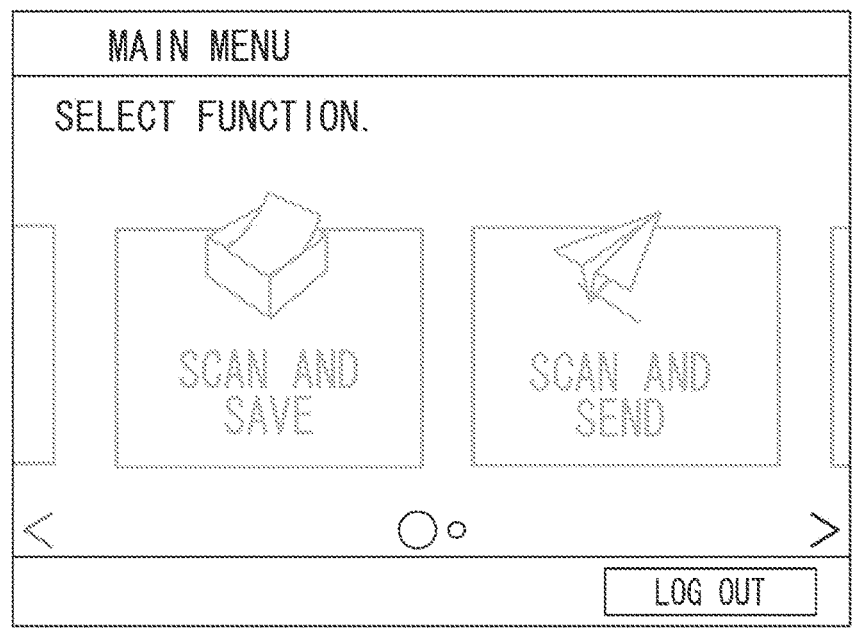
Figure 5D:
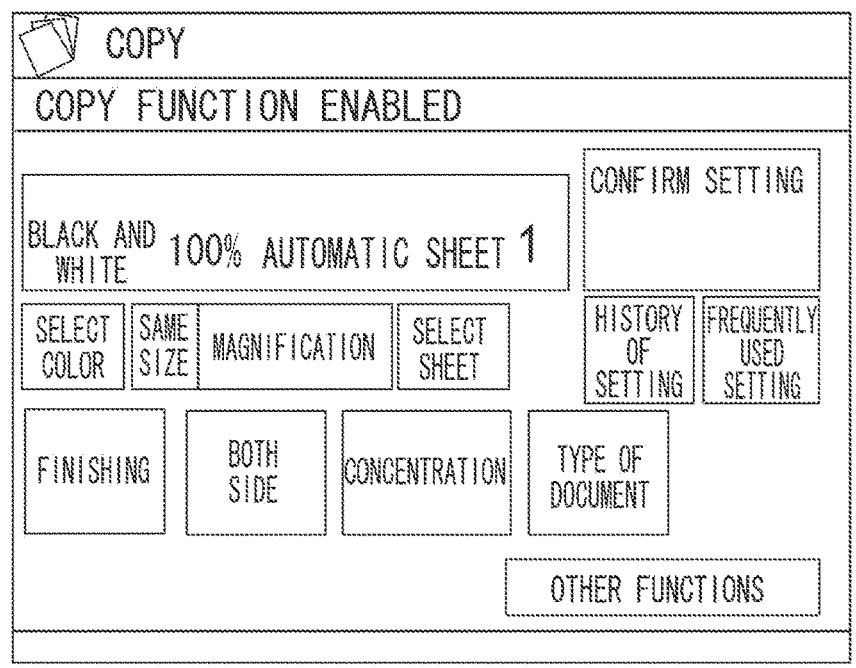

FIGS. 5A to 5D are schematic views illustrating how the transition animation is expressed on the display 119 when the application button is pressed. In the present case, the "copy" button 401 on the menu screen is pressed as an example. Pressing the button 401 triggers the display of the animation as illustrated from FIGS. 5A to 5D. More specifically, the animation is displayed in such a manner that the application button region 400 becomes gradually thinner increasing transmissivity while the image of the button region 400 is gradually expanded. When the screen display preparation for the "copy" application which is the selected function is completed, the "copy" application screen illustrated in FIG. 5D is displayed.

The transition animation is thus displayed using the image of the application button region 400. If there is a change in the application button region 400, the transition control unit 211 performs a process for generating/holding the image for transition. The change in the application button region occurs when, for example, an application button is added or deleted or when the user changes the layout of the menu buttons or the sequence of the buttons.

The size of the image and the transmissivity for display in the application button region 400 are changed along with the time here; however, the transition animation is not limited thereto. Any other animation effect may be employed; for example, the display position may be changed along with the time.

Figure 6:
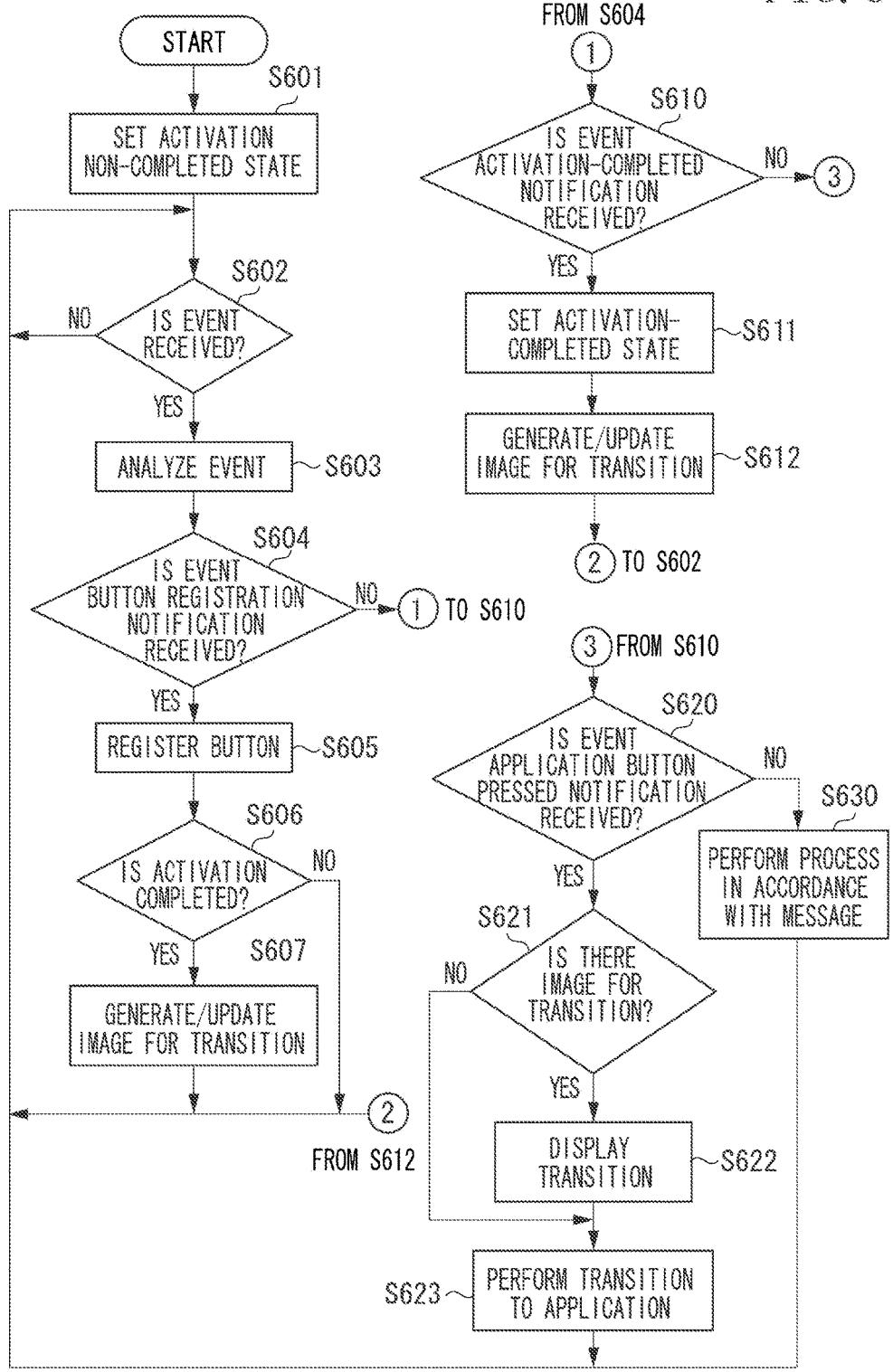
FIG. 6 is a flowchart illustrating an operation of an image forming apparatus according to a first exemplary embodiment.

Next, an operation of the menu function of the image forming apparatus 1 according to the present exemplary embodiment is described with reference to FIG. 6. The steps in FIG. 6 are performed by the CPU 111 executing the programs stored in the ROM 113 or the HDD 116.

When the process of the menu function is started, in step S601, the CPU 111 sets a state to the activation non-completed state. Specifically, the inside of the activation status management unit 212 is set to the "activation non-completed" state. In step S602, the CPU 111 determines whether the event has been received. The event received in step S602 is the event notified from any of the operation input analysis unit 203, the application management unit 204, and the device management unit 205. If the CPU 111 determines that the event is not received (NO in step S602), the process returns to step S602 and the reception of the event is awaited. On the other hand, if the CPU 111 determines that the event is received (YES in step S602), the CPU 111 advances the process to step S603. In step S603, the CPU 111 analyzes the received event. Specifically, the CPU 111 determines the type of the received event with reference to the header part of the event, and advances the process to step S604. In step S604, the CPU 111 determines whether the received event is the application button registration event. The application button registration event is the event that the application management unit 204 notifies the menu function control unit 201 based on the button registration request from the applications 206. If the CPU 111 determines that the event is the application button registration event (YES in step S604), the CPU 111 advances the process to step S605. On the other hand, if the CPU 111 determines that the event is not the application button registration event (NO in step S604), the CPU 111 advances the process to step S610. In step S605, the CPU 111 performs the application button registration process. Specifically, the CPU 111 adds the button name, the icon, and the application ID notified from the applications 206 as the parameters of the application button registration event to a button management table (FIG. 3) managed by the application button management unit 213. Then, the CPU 111 operates the screen display control unit 202 to display the application button additionally in the application button display region 400. Through this process, the menu region additionally displays the application buttons, so that the user can select the function of the application from the menu and use the selected function.

In step S606, the CPU 111 determines whether the activation is completed. Specifically, the CPU 111 determines whether the state held by the activation status management unit 212 is the activation-completed state. If the CPU 111 determines that the activation is completed (YES in step S606), the CPU 111 advances the process to step S607. On the other hand, if the CPU 111 determines that the activation is not completed (NO in step S606), the CPU 111 returns the process to step S602 and performs the process for the next event. In step S607, the CPU 111 performs a process for generating/updating the image for transition. Specifically, the transition control unit 211 is operated to acquire the information about the button displayed in the application button region 400, generate the image for the transition animation, and hold the image in the RAM 112 or the HDD 116. If there is an image already held as the image for the transition animation, that image is updated. The process in this step relatively burdens the CPU 111. After the process in step S607, the CPU 111 returns the process to step S602 and performs a process for the next event.

Next, the process from step S610 when the received event is determined not to be the application button registration event in step S604 is described.

In step S610, the CPU 111 determines whether the received event is the activation-completed notification. The activation-completed notification is the event notified by the device management unit 205 to the menu function control unit 201 when the completion of the activation of the scanner device 2, the printer device 4, and the FAX device 7 is detected. If the CPU 111 determines that the received event is the activation-completed notification (YES in step S610), the CPU 111 advances the process to step S611. On the other hand, if the CPU 111 determines that the received event is not the activation-completed notification (NO in step S610), the CPU 111 advances the process to step S620. In step S611, the CPU 111 sets a state to the activation completed state. Specifically, the state held by the activation status management unit 212 is set to the activation completed state. In step S612, the CPU 111 performs a process for generating/updating the image for transition. This process is similar to that of step S607.

After the process in step S612, the CPU 111 returns the process to step S602 and performs a process for the next event.

Next, the process from step S620 when the received event is determined not to be the activation-completed notification in step S610 is described.

In step S620, the CPU 111 determines whether the received event is the application button pressed notification. The operation input analysis unit 203 analyzes the control signal supplied from the input control unit 114. When it is detected that the operation performed by the user is the pressing of any of the application buttons (401 to 407), the application button pressed notification is transmitted to the menu function control unit 201. If the CPU 111 determines that the received event is the application button pressed notification (YES in step S620), the CPU 111 advances the process to step S621. On the other hand, if the CPU 111 determines that the received event is not the application button pressed notification (NO in step S620), the CPU 111 advances the process to step S630. In step S621, the CPU 111 determines the presence or absence of the image for transition. Specifically, the CPU 111 determines whether the image for transition generated in step S607 or S612 is in the RAM 112 or the HDD 116. If the CPU 111 determines that the image for transition is already generated (YES in step S621), the CPU 111 advances the process to step S622. On the other hand, if the CPU 111 determines that the image for transition is not yet generated (NO in step S621), the CPU 111 advances the process to step S623. In step S622, the CPU 111 performs the transition display process. Specifically, the display control unit 115 is instructed to display the image for transition, which is generated/held by the transition control unit 211 in step S607 or S612, in such a manner that the size or transmissivity of the image is changed along with the time. The display control unit 115 causes the GPU to perform the process to display the transition animation on the display 119.

In step S623, the CPU 111 performs the process for the transition to the application. Specifically, the application change control unit 214 orders the application management unit 204 to change the display. The application management unit 204 performs the process for displaying the application and causes the display 119 to output the signal via the display control unit 115. After step S623, the CPU 111 returns the process to step S602 and performs a process for the next event. If the CPU 111 determines that the received event is not the application button pressed notification in step S620, the CPU performs the process according to the message in step S630. Then, the CPU returns the process to step S602 and performs a process for the next event.

Figure 7A:
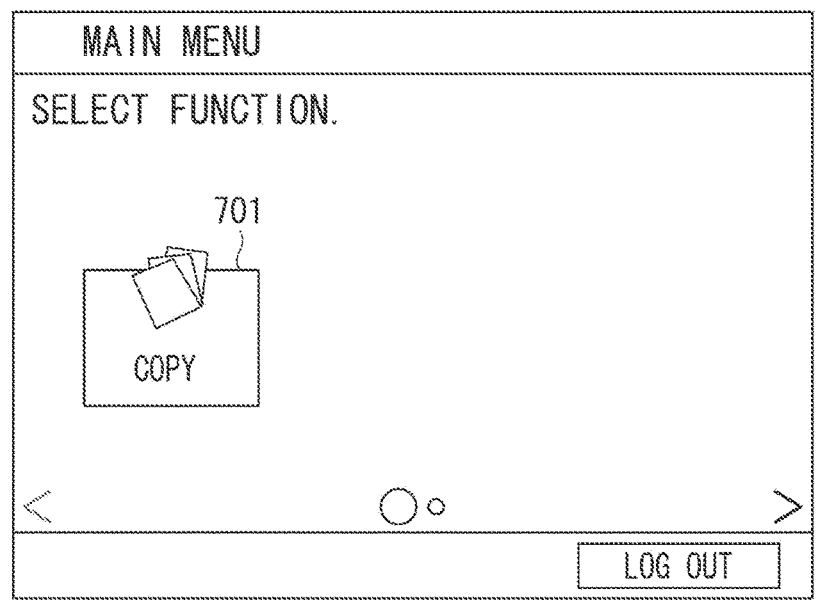
FIGS. 7A, 7B, and 7C illustrate examples of a menu screen displayed on a display when an image forming apparatus according to an exemplary embodiment is activated.
Figure 7B:
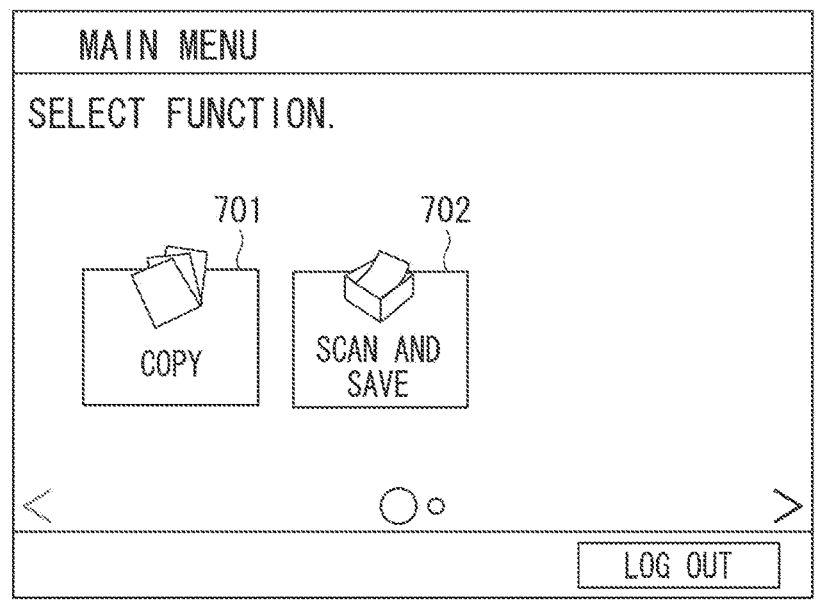
Figure 7C:
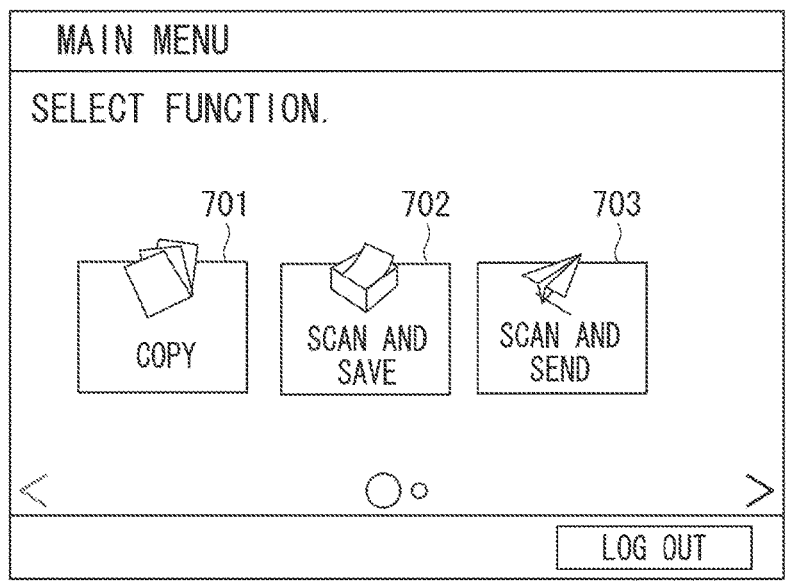

The menu screen displayed on the display 119 when the image forming apparatus 1 is activated through the above operation is described. Turning on the power switch of the image forming apparatus 1 by the user causes the CPU 111 to sequentially execute the process for activating the applications 206 and register the application buttons in the menu. Thus, the number of application buttons of the menu on the display 119 sequentially increases as illustrated in FIGS. 7A to 7C. FIG. 7A illustrates the state in which the button registration process for the copy application, which has been activated first, is already performed. As illustrated in FIG. 7A, just the application button 701 for calling the copy application is displayed. After that, the application buttons 702 and 703 are added as those applications are activated as illustrated in FIGS. 7B and 7C. As the application button is added, the process for generating/updating the image for transition is performed accordingly in general. In the state of FIGS. 7A and 7B, however, the activation status management unit 212 has not received the activation-completed notification yet from the device management unit 205. In this case, the process for generating the image for transition is not performed even if the application button is added. As a result, if the button 701 is pressed in the state of FIGS. 7A and 7B, the transition animation is not displayed but the screen transitions to the screen (FIG. 5D) of the copy application.

After that, for example, it is assumed that the activation status management unit 212 receives the activation-completed notification from the device management unit 205 in the state of FIG. 7C. Then, the transition control unit 211 generates the image for transition at that time. Therefore, if the button 701 is pressed thereafter, the transition animation is displayed as illustrated in FIGS. 5A to 5C and then the screen transitions to the screen (FIG. 5D) of the copy application.

In this manner, the image forming apparatus according to the present exemplary embodiment does not perform the process for generating the image for transition with a relatively large burden (burden on the CPU) during the activation process. This can reduce the warm-up time of the image forming apparatus. After the activation process, the image for transition is generated. The transition animation can be displayed after the activation. As a result, in the normal use, the user can be given the sophisticated operation feeling.

Next, a second exemplary embodiment is described. The first exemplary embodiment has described the example in which whether to generate/update the image for transition depends on whether the apparatus activation is completed. In contrast to this, in the present exemplary embodiment, whether to generate/update the image for transition is determined based on whether the button registration of a particular application has been done. The present exemplary embodiment is hereinafter described mainly based on the difference from the first exemplary embodiment. The system configuration and the software configuration, for example, are the same as those of the first exemplary embodiment, so that those configurations are not described here.

Figure 8:
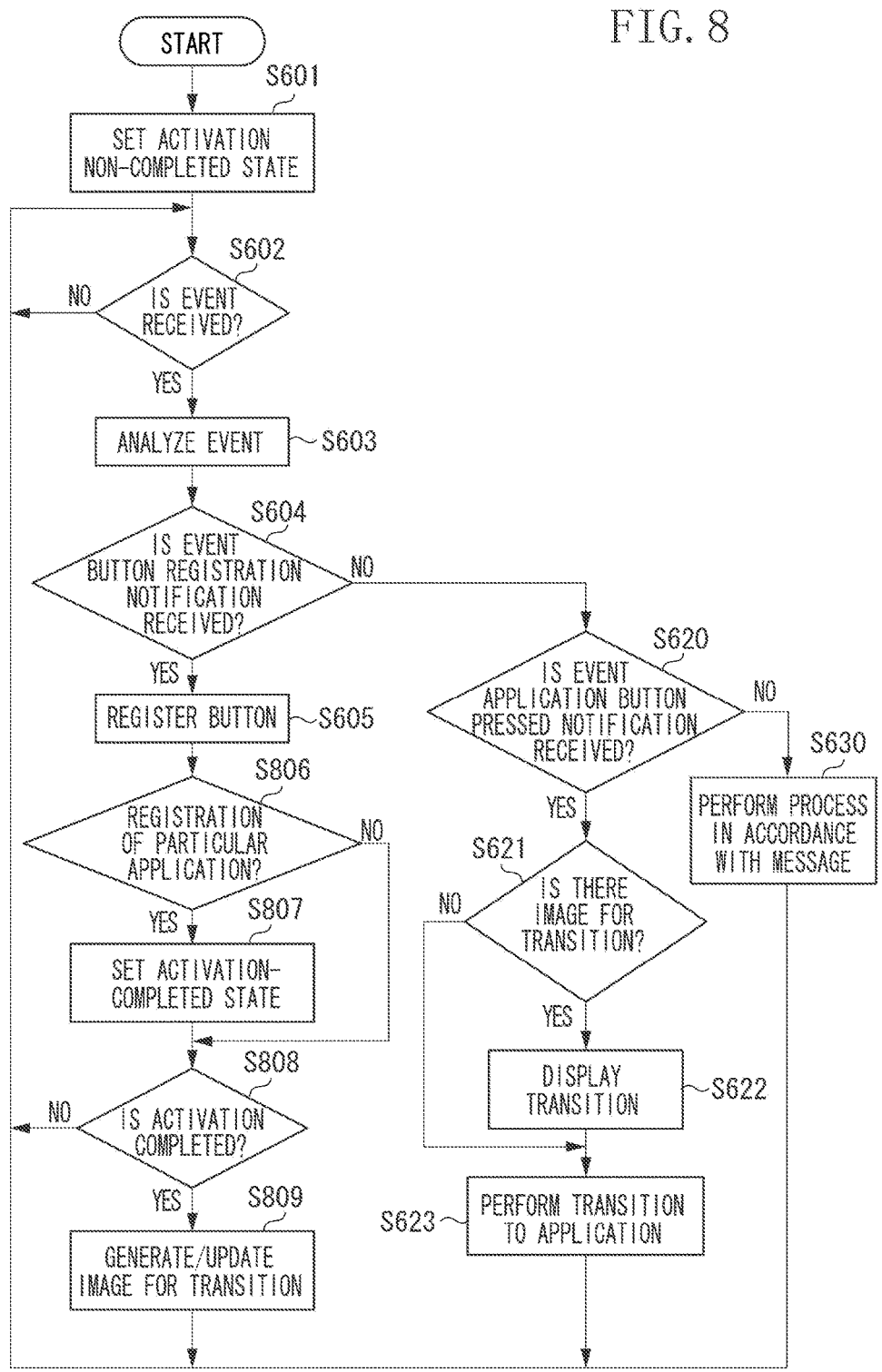
FIG. 8 is a flowchart illustrating an operation of an image forming apparatus according to a second exemplary embodiment.

FIG. 8 is a flowchart for describing the operation of the menu function of the image forming apparatus 1 according to the present exemplary embodiment. Each step in FIG. 8 is processed by the CPU 111 executing the programs stored in the ROM 113 or the HDD 116.

The process from steps S601 to S605 is the same as that of steps S601 to S605 in FIG. 6. In step S806, the CPU 111 determines whether the registered button is the button of a particular application. Specifically, the CPU 111 determines whether the application ID obtained from the application at the time of registering the application button coincides with a predetermined application ID. The particular application is the application that starts up finally among a group of applications to be provided to the users as soon as possible after the activation. The particular application is, for example, "scan and send" and the application ID of the particular application is held in advance in the ROM 113 or the HDD 116. Alternatively, the particular application may be specified by a user. If the CPU 111 determines that the button registration is the button registration of the particular application (YES in step S806), the CPU 111 advances the process to step S807. On the other hand, if the CPU 111 determines that the button registration is not the button registration of the particular application (NO in step S806), the CPU 111 advances the process to step S808.

In step S807, the CPU 111 sets a state to the activation-completed state. Specifically, the state held by the activation status management unit 212 is set to the activation-completed state. The process in step S808 and step S809 is the same as the process in steps S606 and S607 in FIG. 6, and if the activation is completed, the image for transition is generated/updated. The process performed when the received event is determined not to be the application button registration event in step S604 is the same as the process subsequent to step S620 in FIG. 6.

Thus, in the second exemplary embodiment, the process for generating the image for transition is not performed until the process for activating the particular application is finished. This can reduce the warm-up time required to get the particular application ready. The image for transition is generated when the activation of the particular application has finished. Therefore, the transition animation can be displayed after the activation. Therefore, in the normal use, the user can be provided with the sophisticated operation feeling.

In the above exemplary embodiments, the image forming apparatus 1 has a plurality of functions including the copying function, the scanning function, and the printing function. Aspects of the present invention are applicable to another image processing apparatus with some of these functions. Aspects of the present invention are also applicable to an information processing apparatus such as a personal computer, a personal digital assistance (PDA), a portable phone, a FAX, a camera, a video camera, or an image viewer.

Additional embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While aspects of the present invention have been described with reference to exemplary embodiments, it is to be understood that these exemplary embodiments are not seen to be limiting. The scope of the following claims is to be accorded the broadest interpretation so as to encompass all such modifications and equivalent structures and functions.

What is claimed is:

1. A method for controlling an image forming apparatus including a plurality of functions and configured to display, on a first screen, buttons to be selected by a user for using the functions, the buttons respectively corresponding to the plurality of functions, the method comprising:
   displaying, a second screen after displaying a transition image in response to the user's selection of a button being displayed on the first screen;
   wherein the transition image is an image in which the buttons including the selected button on the first screen are enlarged and included, and
   wherein the transition image is displayed in such a way that the transition image overlaps the buttons on the first screen.

2. The method according to claim 1, wherein the transition image is generated according to a completion of activation of the image forming apparatus.

3. The method according to claim 1,
   wherein each function notifies a registration request of a corresponding function button when each function is activated, and
   wherein the displaying displays, according to a reception of the registration request, the corresponding function button on the menu.

4. The method according to claim 1, wherein the transition image is displayed in such a way that transmissivity of the transition image is gradually decreased.

5. The method according to claim 1, wherein the plurality of functions includes at least one of copying, scanning, faxing, or web-browsing.

6. The method according to claim 1, wherein an information processing apparatus includes a scanner that reads an image on a document and generates image data.

7. The method according to claim 1, wherein the information processing apparatus includes a printer that prints image data on a sheet.

8. A non-transitory computer-readable storage medium storing computer executable instructions for causing an image forming apparatus to execute a method for controlling an image forming apparatus including a plurality of functions and configured to display, on a first screen, buttons to be selected by a user for using the functions, the buttons respectively corresponding to the plurality of functions, the method comprising:
   displaying a second screen after displaying a transition image in response to the user's selection of a button being displayed on the first screen;
   wherein the transition image is an image in which the buttons including the selected button on the first screen are enlarged and included, and
   wherein the transition image is displayed in such a way that the transition image overlaps the buttons on the first screen.

9. An information processing apparatus including a plurality of functions and configured to display, on a first screen, buttons to be selected by a user for using the functions, the buttons respectively corresponding to the plurality of functions, the information processing apparatus comprising:
   a display unit configured to display a second screen after displaying a transition image in response to the user's selection of a button being displayed on the first screen,
   wherein the transition image is an image in which the buttons including the selected button on the first screen are enlarged and included, and
   wherein the transition image is displayed in such a way that the transition image overlaps the buttons on the first screen.

10. The information processing apparatus according to claim 9, wherein the information processing apparatus is an image forming apparatus including a plurality of functions including at least one of a copy function and a scanning function.

11. The information processing apparatus according to claim 9,
    wherein the first screen includes buttons respectively prepared for the functions including at least one of a copy function and a scanning function, and
    wherein the second screen is an advanced settings screen for a function corresponding to a button selected on the first screen.

* * * * *